US009884620B2

(12) United States Patent
Hess

(10) Patent No.: US 9,884,620 B2
(45) Date of Patent: Feb. 6, 2018

(54) AUTOMATED PARKING SYSTEM

(71) Applicant: Robert Bosch GmbH, Stuttgart (DE)

(72) Inventor: Felix Hess, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/136,715

(22) Filed: Apr. 22, 2016

(65) Prior Publication Data

US 2016/0318510 A1 Nov. 3, 2016

(30) Foreign Application Priority Data

Apr. 30, 2015 (DE) .................. 10 2015 208 058

(51) Int. Cl.
*B60W 30/06* (2006.01)
*B60W 10/20* (2006.01)
*B60W 10/18* (2012.01)
*G08G 1/16* (2006.01)
*B62D 15/02* (2006.01)
*G08G 1/04* (2006.01)

(52) U.S. Cl.
CPC ............ *B60W 30/06* (2013.01); *B60W 10/18* (2013.01); *B60W 10/20* (2013.01); *B62D 15/0285* (2013.01); *G08G 1/04* (2013.01); *G08G 1/168* (2013.01); *B60W 2550/20* (2013.01); *B60W 2550/402* (2013.01); *B60W 2720/24* (2013.01)

(58) Field of Classification Search
None
See application file for complete search history.

(56) References Cited

U.S. PATENT DOCUMENTS

| 6,340,935 | B1 * | 1/2002 | Hall ..................... G08G 1/14 340/905 |
| 2010/0106356 | A1 * | 4/2010 | Trepagnier ............ G01S 17/023 701/25 |
| 2014/0036076 | A1 * | 2/2014 | Nerayoff ............... H04N 7/181 348/148 |

(Continued)

FOREIGN PATENT DOCUMENTS

| DE | 102012222562 A1 | 6/2014 |
| WO | 2015004581 A1 | 1/2015 |

OTHER PUBLICATIONS

Robert Oshana & Mark Kraeling, Software Engineering for Embedded Systems: Methods, Practical Techniques, and Applications (2013).*

Primary Examiner — Nicholas Kiswanto
Assistant Examiner — Tamara Weber
(74) Attorney, Agent, or Firm — Norton Rose Fulbright US LLP; Gerard Messina

(57) ABSTRACT

A method for determining the position of a motor vehicle on a traffic area of a parking facility includes the steps of scanning a camera image of the traffic area including the motor vehicle, determining a position of the motor vehicle based on the camera image, scanning the motor vehicle with the aid of a stationary sensor on the traffic area, and validating or correcting the determined position based on the scanning with the aid of the stationary sensor. The stationary sensor is configured like a parking facility sensor, which is configured to determine the presence of a motor vehicle parked in a parking space of the parking facility, the parking space being reachable with the aid of the motor vehicle via the traffic area.

14 Claims, 1 Drawing Sheet

(56) References Cited

U.S. PATENT DOCUMENTS

2014/0058613 A1* 2/2014 Leinfelder ........... B62D 15/028
  701/28
2016/0075325 A1* 3/2016 Kim ..................... B60W 30/06
  701/23
2016/0264132 A1* 9/2016 Paul ..................... B60W 30/06

* cited by examiner

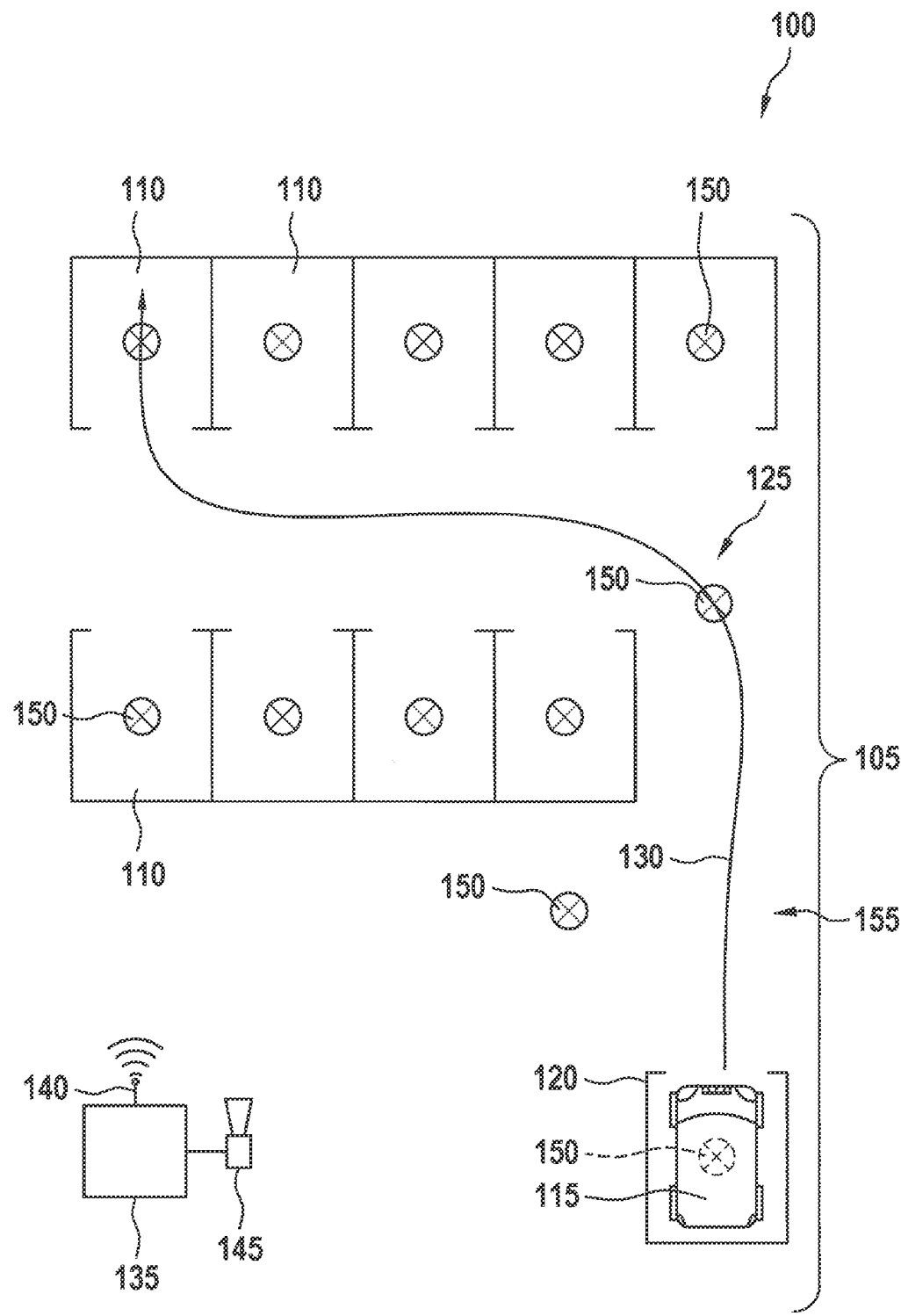

AUTOMATED PARKING SYSTEM

FIELD OF THE INVENTION

The present invention relates to an automated parking system. The present invention relates in particular to safeguarding the automated parking system against errors.

BACKGROUND INFORMATION

A parking system includes a parking facility having multiple parking spaces for parking motor vehicles, in the parking system a motor vehicle being steerable in an automated manner on a route between a service area and one of the parking spaces on the parking facility. Such a process is known by the designation automated valet parking (AVP). If a motor vehicle is to be parked on the parking facility, it suffices that the driver drops off the motor vehicle in the service area and leaves it there. The motor vehicle then drives in an automated manner to one of the parking spaces which it is assigned by a management system, for example. If the motor vehicle is to be picked up again, it may drive in the opposite direction in an automated manner from the parking space to the service area, where the driver enters and personally steers the motor vehicle outside the parking facility as usual.

At present, it is necessary for safety reasons to monitor the motor vehicle on its way between the service area and one of the parking spaces on the parking facility with the aid of cameras, which are fixedly installed on the parking facility. If the motor vehicle leaves the route or if another hazard is determined based on the camera images, it is possible to stop the motor vehicle, for example. The vehicle-external monitoring may complete or monitor a vehicle-internal control.

The motor vehicle tracking with the aid of cameras, however, is not reliable under all circumstances. For example, a person or an object may block a camera, or a position determination of the motor vehicle may be subject to errors due to the perspective of the camera onto the motor vehicle. Sometimes it is also not possible to track the motor vehicle completely on the route due to a lack of a sufficient number of cameras.

SUMMARY OF THE INVENTION

It is thus the object of the present invention to provide a technology with the aid of which an AVP parking system may be safeguarded in an improved manner. The present invention achieves this object with the aid of the subject matters of the descriptions herein. The further description herein describe specific embodiments.

A method for determining the position of a motor vehicle on a traffic area of a parking facility includes the steps of scanning a camera image of the traffic area including the motor vehicle, determining a position of the motor vehicle based on the camera image, scanning the motor vehicle with the aid of a stationary sensor on the traffic area, and validating or correcting the determined position based on the scanning with the aid of the stationary sensor. The stationary sensor is identical in design to a parking facility sensor, which is configured to determine the presence of a motor vehicle parked in a parking space of the parking facility, the parking space being reachable with the aid of the motor vehicle via the traffic area.

According to the method, identical sensors may be used to determine motor vehicles in a parking space and on a traffic area. The identical sensors may simplify the processing of the corresponding sensor signals. The position of the motor vehicle may be determined in an improved manner based on signals of the stationary sensor. In one specific embodiment, multiple positions of the motor vehicle are determined, which may be merged to form a trajectory. The signal of the stationary sensor may be used to derive a speed of the motor vehicle.

The motor vehicle may be automatically steered based on the validated or corrected position on a route between a service area and the parking space.

An integrated system may thus be provided, which implements or may support a management of the parking facility, in particular with respect to reserving, assigning and billing of parking spaces, on the one hand, and an AVP on the other hand. The AVP functionality may be improved or safeguarded based on a simple and cost-effective parking facility sensor by the improved determination of a position of the motor vehicle.

It is also possible to determine that the position of a motor vehicle which was scanned with the aid of the stationary sensor is not determinable based on the camera image, and the motor vehicle is stopped. In one further specific embodiment, it is also possible to stop the entire AVP operation, for example by stopping all motor vehicles steered in the area of the parking facility. The safety of the AVP operation may thus be ensured and increased.

A computer program product includes a program code arrangement having program code for carrying out the above-described method if the computer program product runs on a processing device or is stored on a computer-readable data carrier.

According to a further aspect of the present invention, it is proposed to use a parking sensor, which is configured to determine the presence of a motor vehicle parked in a parking space of a parking facility, as a position sensor to validate or correct a position of a motor vehicle on a traffic area which was determined based on a camera image.

A control system for a parking facility includes a parking facility sensor in a parking space of the parking facility, the parking facility sensor being configured to determine a parked motor vehicle, a camera for providing a camera image of the traffic area including the motor vehicle, a processing device for determining a position of the motor vehicle based on the camera image, and a stationary sensor in the area of a traffic area via which the parking space may be reached with the aid of the motor vehicle. The processing device is configured to validate or correct the determined position based on a scanning with the aid of the stationary sensor. The stationary sensor is additionally identical in design to the parking facility sensor.

Advantageously, a parking facility sensor which is known per se may be used to validate, verify or correct a determined position of the motor vehicle. Other customary sensors which are used for this purpose, such as a light barrier, are not required. In this way, the parts variety of the system may be reduced. This may facilitate the set-up, operation and maintenance of the system. The installation of the parking facility sensor for use as a stationary sensor may take place easily and cost-effectively, for example within the scope of the installation of a parking facility sensor in the area of a parking space. The parking facility sensor may have a simple and cost-effective design. In one specific embodiment, the parking facility sensor supports settable scanning intervals, the scanning interval of the parking facility sensor usually being shorter in the area of the traffic area where it must be possible to detect a moving motor vehicle than for a parking facility sensor in the area of a parking space.

The parking facility sensor may be configured to be attached on or in a ground of the parking facility or of a parking space for a vehicle. In this way, a high determination reliability may be provided. Moreover, the parking facility sensor may be easy to install. In other variants, the parking facility sensor may also be attached in another location, in particular above or next to a parking space.

A further stationary sensor may be attached in the area of a traffic junction of the traffic area, the motor vehicle being steered as a function of a signal of the further stationary sensor which indicates a further motor vehicle. The further stationary sensor may in particular be attached on an access to the traffic junction, so that an approaching motor vehicle is already detectable.

The AVP system may anticipatorily steer the motor vehicle in an improved manner in both specific embodiments. A collision prevention between motor vehicles may thus already be provided on the part of the infrastructure. An additional collision prevention may be carried out with the aid of an onboard arrangement of the motor vehicle.

The present invention is described in greater detail hereafter with reference to the accompanying drawing.

BRIEF DESCRIPTION OF THE DRAWING

FIG. 1 shows a schematic illustration of a parking system.

DETAILED DESCRIPTION

FIG. 1 schematically shows a parking system 100, which includes a parking facility 105 having multiple parking spaces 110, each for parking a motor vehicle 115. Parking system 100 furthermore includes a service area 120, where a motor vehicle 115 may be dropped off by the driver or picked up by a driver. A traffic area 125 on which motor vehicle 115 may be driven is provided between service area 120 and parking spaces 110. A route 130 leads from service area 120 to one of parking spaces 110, or in the opposite direction.

Parking system 100 may be configured for automated valet parking (AVP). A driver may drop off his or her motor vehicle 115 on service area 120, from where motor vehicle 115 is steered in an automated or driver-independent manner on route 130 to a predetermined parking space 110. If the driver would like to pick up motor vehicle 115 again later, motor vehicle 115 is steered in an automated manner from parking space 110 on an appropriate route 130 back to service area 120, where the driver may take charge of motor vehicle 115.

Different approaches are known for the automated driving of motor vehicle 115 on route 130. In a first specific embodiment, motor vehicle 115 is steered by a control unit 135, which is part of parking system 100 and attached outside motor vehicle 115. Control unit 135 may include a wireless interface 140, for example, with the aid of which it establishes contact with motor vehicle 115. One or multiple cameras 145 may be provided for monitoring motor vehicle 115.

In a second specific embodiment, motor vehicle 115 is driving based on pieces of information it receives from control unit 135, control unit 135 actively assisting the driving procedure of motor vehicle 115 on route 130. This specific embodiment is also referred to as a cooperative infrastructure.

In a third specific embodiment, motor vehicle 115 drives exclusively based on predetermined data, for example a site plan of parking facility 105 and a position of a parking space 110 to be headed for.

At least in the first two specific embodiments, motor vehicle 115 is monitored by parking system 100, i.e., from outside motor vehicle 115, on route 130. For this purpose, in particular a position of motor vehicle 115 may be determined or tracked based on images of camera 145. The images of multiple cameras 145, which record motor vehicle 115 simultaneously or successively, may be put in relation to each other for this purpose. The achievable positioning accuracy, however, may be too low to ensure that motor vehicle 115 is safeguarded against an accident, for example the collision with a parking space barrier, a person or another motor vehicle 115, under all circumstances. The position of motor vehicle 115 may thus also be selectively scanned with the aid of another sensor 150. The position determined via the camera image may then be validated or corrected based on the position scanned with the aid of sensor 150.

Sensor 150 may implement an arbitrary physical measuring principle. Sensor 150 may be passive in that it evaluates a physical signal present in the measuring range, or may be active in that it provides a corresponding physical signal in the measuring range and evaluates its influence by vehicle 115.

Examples of passive sensors include magnetometers and photosensors, while active sensors may include radar sensors, LIDAR sensors or ultrasonic sensors, for example.

It is suggested to use in particular a parking facility sensor 150 as sensor 150, such as that which may be used to determine an occupancy of a parking space 110. In this function, it is configured to determine the presence of a motor vehicle 115 in a measuring range and to transmit the determination result to a processing device, which, based on the received pieces of information, is able to control parking system 100 in particular with respect to assigning, reserving and billing of parking spaces 110. The processing device may coincide with control unit 135 or be configured integrated therewith. For transmission, a wired, wireless or mixed wireless and wired transmission may be used, which interface 140 may use.

Control unit 135 may in particular be part of an automated parking system, which allows motor vehicle 115 to be driven on route 130 in an automated manner. Such a system is known by the designation "automated valet parking" (AVP). Parts of driving or steering motor vehicle 115 on the route may be carried out on the part of motor vehicle 115 itself, while other parts may be carried out on the part of control unit 135. An in particular wireless network, which may be connected to interface 140, may be used for the communication between control unit 135 and motor vehicle 115.

An additional parking facility sensor 150 may be attached in a further predetermined position on traffic area 125 or on service area 120 to enable or to improve the tracking of motor vehicle 115 by parking system 100. The additional parking sensor 150 may be situated in the area of a traffic junction 155, for example, in particular on an access to traffic junction 155. Traffic junction 155 may in particular include an important position in terms of traffic, such as an intersection, a junction, a ramp or merging lanes.

The additional parking sensor 150 may also be used to scan a further motor vehicle 115 approaching an area which the first motor vehicle 115 is about to use, for example. In this case, the first motor vehicle 115 may be activated to stop or to not drive into the area of the further parking sensor 150 in order to prevent a collision.

What is claimed is:

1. A method for determining the position of a motor vehicle on a traffic area of a parking facility, the method comprising:

scanning a camera image of the traffic area including the motor vehicle;
determining a position of the motor vehicle based on the camera image;
scanning the motor vehicle with a stationary sensor on the traffic area; and
validating or correcting the determined position based on the scanning with the stationary sensor;
wherein the stationary sensor is configured to determine a presence of a motor vehicle parked in a parking space of the parking facility,
wherein the parking space is reachable with the motor vehicle via the traffic area, and
wherein the motor vehicle is automatically steered based on a validated or a corrected position on a route between a service area and the parking space, and
wherein a further stationary sensor is attached in the area of a traffic junction of the traffic area, and the motor vehicle is steered as a function of a signal of the further stationary sensor which indicates a further motor vehicle.

2. The method claim 1, wherein if the position of a motor vehicle, which was scanned with the stationary sensor, is not determinable based on the camera image, the motor vehicle is stopped.

3. The method of claim 1, wherein a parking facility sensor, which is configured to determine the presence of a motor vehicle parked in a parking space of the parking facility, is used as a position sensor to validate or correct a position of a motor vehicle on a traffic area which was determined based on a camera image.

4. The method of claim 1, wherein the stationary sensor includes at least one of a passive sensor or an active sensor, and wherein the further stationary sensor includes at least one of a passive sensor or an active sensor.

5. The method of claim 4, wherein the passive sensor includes at least one of a magnetometer or a photosensor, and wherein the active sensor includes at least one of a radar sensor, a LIDAR sensor, or an ultrasonic sensor.

6. A non-transitory computer readable medium having a computer program, which is executable by a processor, comprising:
a program code arrangement having program code for determining the position of a motor vehicle on a traffic area of a parking facility, by performing the following:
scanning a camera image of the traffic area including the motor vehicle;
determining a position of the motor vehicle based on the camera image;
scanning the motor vehicle with a stationary sensor on the traffic area; and
validating or correcting the determined position based on the scanning with the stationary sensor;
wherein the stationary sensor is configured to determine a presence of a motor vehicle parked in a parking space of the parking facility,
wherein the parking space is reachable with the motor vehicle via the traffic area,
wherein the validated or corrected position on a route between a service area and the parking space is provided to the motor vehicle which uses the validated or corrected position to automatically steer the motor vehicle, and
wherein a further stationary sensor is attached in the area of a traffic junction of the traffic area, and the motor vehicle is steered as a function of a signal of the further stationary sensor which indicates a further motor vehicle.

7. The computer readable medium of claim 6, wherein the stationary sensor includes at least one of a passive sensor or an active sensor, and wherein the further stationary sensor includes at least one of a passive sensor or an active sensor.

8. The computer readable medium of claim 7, wherein the passive sensor includes at least one of a magnetometer or a photosensor, and wherein the active sensor includes at least one of a radar sensor, a LIDAR sensor, or an ultrasonic sensor.

9. A control system for a parking facility, comprising:
a parking facility sensor on a parking space of the parking facility, the parking facility sensor being configured to determine a parked position of a motor vehicle;
a camera for providing a camera image of a traffic area including the motor vehicle;
a processing device for determining a position of the motor vehicle based on the camera image; and
a stationary sensor in the area of a traffic area via which the parking space is reachable with the motor vehicle;
wherein the processing device is configured to validate or correct the determined position based on a scanning with the stationary sensor,
wherein the stationary sensor is configured the same as the parking facility sensor, which is configured to determine a presence of a motor vehicle parked in a parking space of the parking facility, the parking space being reachable by the motor vehicle via a traffic area, and
wherein a further stationary sensor is attached in the area of a traffic junction of the traffic area, and the motor vehicle is steered as a function of a signal of the further stationary sensor which indicates a further motor vehicle.

10. The control system of claim 9, wherein the parking facility sensor is configured to be coupled to a ground of the parking facility.

11. The control system of claim 9, wherein the further stationary sensor is configured to access the traffic junction.

12. The control system of claim 9, wherein the stationary sensor includes at least one of a passive sensor or an active sensor, and wherein the further stationary sensor includes at least one of a passive sensor or an active sensor.

13. The control system of claim 12, wherein the passive sensor includes at least one of a magnetometer or a photosensor, and wherein the active sensor includes at least one of a radar sensor, a LIDAR sensor, or an ultrasonic sensor.

14. A control system for a parking facility, comprising:
a parking facility sensor on a parking space of the parking facility, the parking facility sensor being configured to determine a parked position of a motor vehicle;
a camera for providing a camera image of a traffic area including the motor vehicle;
a processing device for determining a position of the motor vehicle based on the camera image; and
a stationary sensor in the area of a traffic area via which the parking space is reachable with the motor vehicle;
wherein the processing device is configured to validate or correct the determined position based on a scanning with the stationary sensor,
wherein the stationary sensor is configured the same as the parking facility sensor, which is configured to determine a presence of a motor vehicle parked in a parking space of the parking facility, the parking space being reachable by the motor vehicle via a traffic area, and wherein the stationary sensor includes at least one of a passive sensor or an active sensor, and wherein a further stationary sensor includes at least one of a passive sensor or an active sensor, and wherein the passive sensor includes at least one of a magnetometer or a photosensor, and wherein the active sensor includes at least one of a radar sensor, a LIDAR sensor, or an ultrasonic sensor, and wherein the motor vehicle is steered as a function of a signal of a further stationary sensor which indicates a further motor vehicle.

\* \* \* \* \*